(12) United States Patent
Siomina et al.

(10) Patent No.: US 8,804,574 B2
(45) Date of Patent: Aug. 12, 2014

(54) LANGUAGE DEPENDENT POSITIONING AND SIGNALLING

(75) Inventors: Iana Siomina, Solna (SE); Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 360 days.

(21) Appl. No.: 13/094,172

(22) Filed: Apr. 26, 2011

(65) Prior Publication Data

US 2012/0082091 A1   Apr. 5, 2012

Related U.S. Application Data

(60) Provisional application No. 61/388,821, filed on Oct. 1, 2010.

(51) Int. Cl.
*H04W 4/02* (2009.01)
*H04W 4/22* (2009.01)
*H04W 8/22* (2009.01)

(52) U.S. Cl.
USPC ............... 370/259; 455/456.2; 455/456.3

(58) Field of Classification Search
CPC ..... H04W 4/02; H04W 76/007; H04W 40/20; H04W 4/025
USPC .......... 370/259, 270, 312, 329, 338; 455/456.1, 456.2, 456.3, 456.6; 379/88.06, 142.1, 207.12
See application file for complete search history.

(56) References Cited

U.S. PATENT DOCUMENTS

| | | | |
|---|---|---|---|
| 6,161,082 A | | 12/2000 | Goldberg et al. |
| 6,944,464 B2 * | | 9/2005 | Muranaga ............ 455/456.1 |
| 7,139,820 B1 * | | 11/2006 | O'Toole et al. ............ 709/223 |
| 7,205,890 B2 * | | 4/2007 | Defant et al. ........... 340/539.13 |
| 7,272,377 B2 * | | 9/2007 | Cox et al. ............... 455/403 |
| 7,536,293 B2 | | 5/2009 | Zhuo et al. |
| 7,660,594 B2 | | 2/2010 | Chava et al. |
| 7,689,245 B2 | | 3/2010 | Cox et al. |
| 2004/0023666 A1 * | | 2/2004 | Moon et al. ............. 455/456.1 |
| 2004/0203919 A1 * | | 10/2004 | Ross et al. ............. 455/456.1 |
| 2006/0276167 A1 | | 12/2006 | Burroughs |

(Continued)

FOREIGN PATENT DOCUMENTS

WO   2011/126448 A2   10/2011

OTHER PUBLICATIONS

3GPP TS 23.032 V8.0.0; Technical Specification; "3rd Generation Partnership Project; Technical Specification Group Services and System Aspects;Universal Geographical Area Description (GAD)" (Release 8); Dec. 2008; pp. 1-29.

(Continued)

*Primary Examiner* — Ahmed Elallam
(74) *Attorney, Agent, or Firm* — Patent Portfolio Builders PLLC

(57) ABSTRACT

Presented is a system and methods for allowing the translation the civic address portion of a positioning message to different languages. The positioning message can be in response to an Emergency-911 call providing much better information regarding the location of the caller associated with the user equipment on a wireless network. The positioning message can contain an indicator of the originating language or a translation of the language from the originating language to the preferred or required language of the destination address. The positioning message can also contain a series of translated messages representing all the languages supported by the wireless network.

28 Claims, 11 Drawing Sheets

(56) References Cited

U.S. PATENT DOCUMENTS

| | | |
|---|---|---|
| 2007/0027997 A1* | 2/2007 | Polk .............................. 709/230 |
| 2007/0071181 A1* | 3/2007 | Hwang ........................... 379/45 |
| 2007/0191029 A1* | 8/2007 | Zarem et al. ............... 455/456.5 |
| 2008/0021697 A1* | 1/2008 | Cox et al. ......................... 704/2 |
| 2008/0114539 A1 | 5/2008 | Lim |
| 2009/0048820 A1* | 2/2009 | Buccella ........................... 704/2 |
| 2009/0181698 A1 | 7/2009 | Farmer et al. |
| 2010/0013701 A1 | 1/2010 | Fischer et al. |
| 2010/0041418 A1 | 2/2010 | Edge et al. |
| 2010/0190479 A1* | 7/2010 | Scott et al. ................ 455/414.1 |

OTHER PUBLICATIONS

3GPP TS 36.413 V9.4.0; Technical Specification; "3rd Generation Partnership Project; Technical Specification Group Radio Access Network; Evolved Universal Terrestrial Radio Access Network (E-UTRAN); S1 Application Protocol (S1AP)" (Release 9); Sep. 2010; pp. 1-241.

International Search Report in corresponding International Application No. PCT/SE2011/051005 mailed Feb. 6, 2012.

3rd Generation Partnership Project (3GPP) Draft; "NENA VoIP Location Working Group"; Attachment: Background-Location-Requirements; 053006; Cedex, France. May 30, 2006 [retrieved on Aug. 18, 2006]; pp. 1-11; vol. SA WG2, No. Sophia; Aug. 18, 2006; XP050256582.

H. Schulzrinne et al., "Requirements for Emergency Context Resolution with Internet Technologies", Network Working Group, RFC 5012, Jan. 2008, pp. 1-23.

T. Wigren et al., "Emergency Call Delivery Standards Impair Cellular Positioning Accuracy", to appear in Proceeding of IEEE ICC 2010, Cape Town, South Africa, May 2010.

3GPP TS 23.271, "Functional Stage 2 Description of Location Services (LCS)", Dec. 2009, V9.2.0.

* cited by examiner

LANGUAGE DEPENDENT POSITIONING AND SIGNALLING

This Non-provisional application claims priority under 35 U.S.C. §119(e) on U.S. Provisional Application No. 61/388,821 filed on Oct. 1, 2010, the entire contents of which are hereby incorporated by reference into the present application.

TECHNICAL HELD

The present invention relates in general to positioning in wireless communications networks and in particular to wireless network architectures that are presently depending on signal measurements from multiple cells or satellites for positioning, location and location-based services.

BACKGROUND

As technology advances, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and wireless networks have added a mobile element to communications.

The possibility of identifying the geographical location of users in cellular networks has enabled a large variety of commercial and non-commercial services, e.g., navigation assistance, social networking, location-aware advertising, emergency calls, etc. Different services may have different positioning accuracy requirements imposed by the application. In addition, some regulatory requirements on the positioning accuracy for basic emergency services exist in some countries, i.e. Federal communications Commission (FCC) Emergency 911 (E911) in US.

The accuracy of the provided result, as well as the response time, depend on a number of factors such as propagation environment, terminal capability, network capability, requested quality of service (QoS), positioning methods availability, and positioning method selection procedure. At least the following positioning technologies are currently being considered for Long Term Evolution (LTE): Assisted Global Navigation Satellite System (A-GNSS), Time Difference of Arrival (TDOA), Fingerprinting, Cell ID (CID), Enhanced CID (E-CID), Adaptive Enhanced CID (AECID), Angle of Arrival (AoA) and Hybrid positioning. Uplink Time Difference of Arrival (U-TDOA) is still under discussion in the 3rd Generation Partnership Project (3GPP). The variety of the standardized methods is explained not only by the range of applications and location services (LCS), but also by their environment- and deployment-dependent performance. In the challenging environments, different methods may also complement each other to achieve the desired accuracy, e.g. by being hybridized. It has also been shown that using various types of measurements and positioning-related information can enhance positioning performance significantly, which is exploited, for example, in the AECID method.

In any positioning architecture, the following three network elements are important: the LCS client, the LCS target and the LCS server. The LCS server is a physical or logical entity managing positioning for a LCS target device (such as User Equipment (UE), user terminals and radio nodes in general, e.g. sensor, relay, small base stations) by obtaining measurements and other location information, providing assistance data to assist the LCS target device in measurements, and computing, or verifying the final position estimate. Examples of LCS servers in LTE are Evolved Serving Mobile Location Center (E-SMLC) in a the control plane solution and Secure User Plane Location (SUPL) Location Platform (SLP) in a user-plane solution, both referred to as a positioning node herein.

The positioning function may reside in a terminal (e.g. with UE-based positioning), radio network node (e.g. Radio Network Controller (RNC) in a Universal Mobile Telecommunications System (UMTS)) or a core network node (e.g. positioning node in UE-assisted or network-based positioning). The input to the positioning function, which performs the actual positioning of a specific target node (e.g., a terminal or radio node), is a positioning request from an LCS Client with a set of parameters such as QoS requirements. The end results of the positioning function are the location information for the positioned target node communicated as a part of the positioning response. An LCS client is a software and/or hardware entity which may or may not reside in the target node being positioned. The LCS client may be internal or external to the Public Land Mobile Network (PLMN). The positioning result is communicated at least to the requesting entity but possibly also to other nodes, including the terminal itself.

The location information may be requested by and reported to an LCS Client associated with a UE or radio node, or by an LCS Client within or attached to the Core Network. The location information may also be utilized internally in the system; for example, for location-assisted handover or to support other features such as home location billing. The location information request may also ask for the velocity of the as part of the positioning information.

The positioning target may be any device that is being positioned. This can be a UE, a laptop, or a terminal in a more general sense or it may even be a small radio node such as abuse station, access point, relay, repeater, beacon device, etc. The terms 'terminal' or 'UE' are used herein interchangeably with 'positioning target', but the non-limiting terminology can be easily understood by the skilled in the art.

Due to the above, the target nodes may have different characteristics and thus may have different capabilities which may impact the amount and the contents of any downloaded assistance information, the set of feasible reporting formats, and the positioning method selection. The target node capability my be signaled to the network together with the positioning request or may be requested later by the positioning server prior to calling the positioning function. To inform the target node on network capabilities, e.g., the set of available positioning methods, the network capability information may also be communicated to the target node.

In many of the devices storing positioning information, part of the positioning information may be provided by the end user and may be entered in a language other than the default language of the local area. For example, positioning information entered in Spanish in an English language country. Accordingly, locating a particular device on a cellular network can be enhanced by employing positioning information to identify the location of the device. As indicated above the use of this information requires the ability to translate the positioning information between different languages.

Consequently, market pressure is building for a solution which would allow an end user to enter positioning information in a language of their choice and allow the positioning information to be usable, in a translated format, by other nodes on the network for locating the device. Accordingly, the ability to translate positioning information from a language entered at a node or device to a language required or preferred by other node or device. For example, it may be ensured that the positioning information received from the positioning node by the target device or Emergency-911 Public Safety Answering Point (PSAP) can be understood and the dispatch of emergency services to a location occurs with a greater degree of accuracy.

SUMMARY

Systems and methods according to the present invention address the market needs described above by providing the capability to generate the positioning information in the language supported/preferred by the node receiving this information and/or to augment a positioning-related message with an information element associated with the language of a civic address associated with the positioning message. Translation nodes are located around the wireless network and allow for the positioning messages to be delivered in a language best suited for the destination of the positioning message. The language specification can be based on geographical, national, or commercial boundaries and can also provide multiple translations of the civic address in the positioning message.

In one exemplary embodiment, the translation is performed in the positioning node, where the translation comprises generating positioning result in the language supported/preferred by the LCS Client acquired by the positioning node. The translation comprises the translation from one language to one or more other languages, where the language may be understood in a general sense as a system of signs for encoding and decoding information, e.g., English language, French language, or any written form of a sign or any symbolic language.

In another exemplary embodiment, the positioning-related message is the message including positioning result, e.g., a message transmitted by a radio node to the UE (e.g. via Radio Resource Control (RRC)), a positioning response transmitted by the positioning node to LCS Client (e.g. via LTE Positioning Protocol (LPP)), a positioning response transmitted by the positioning node to PSAP, which is herein understood in a general sense i.e. anode with a functionality similar to PSAP, a message between positioning node and a translation point, or a text message including at least positioning result in non-voice emergency communication.

In another exemplary embodiment, a method provides an information element for specifying the language of the civic address to present when delivering the positioning message to the destination node. In a further aspect of the exemplary embodiment, the method provides the capability to incorporate the information element into the positioning message and transmit the positioning message towards the destination address. It should be noted in the exemplary embodiment that the positioning message can be transmitted towards a plurality of destination addresses and each destination address can have a different language requirement for the civic address.

In another exemplary embodiment, a system is presented for incorporating the capabilities of a method into one or more existing nodes in a wireless network or UE or at least one new network node with the functionality described by the invention or for distributing the capabilities throughout many nodes of the wireless network. In one aspect of the exemplary system embodiment, a translation component provides the capability to translate the civic address of a positioning message based on information collected from the wireless network. In another aspect of the exemplary embodiment, a coordination component provides the capability to collect the language capabilities of the translation nodes on the wireless network and include language specifications of the civic address of a positioning message or to incorporate one or more translations of the civic address of the positioning message.

In another exemplary embodiment, methods for resolving language conflicts are provided.

BRIEF DESCRIPTION OF THE DRAWINGS

The accompanying drawings illustrate exemplary embodiments, wherein.

Figure 1:
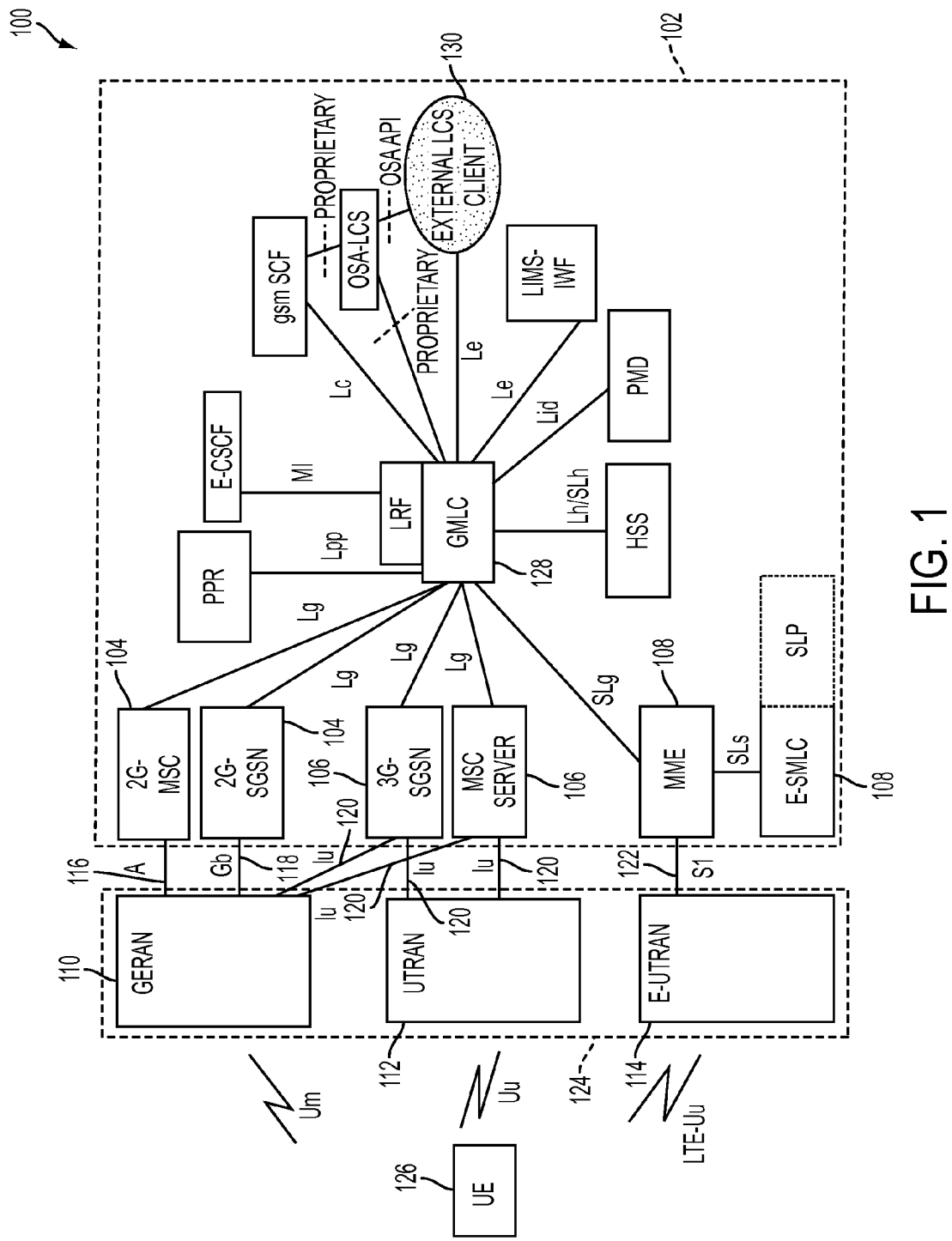
FIG. 1 depicts a general arrangement of an LCS.

| ACRONYM/ABBREVIATION LIST | |
|---|---|
| 3GPP | 3rd Generation Partnership Project |
| A-GPS | Assisted GPS |
| BS | Base Station |
| CRS | Cell-Specific Reference Signal |
| eNodeB | evolved Node B |
| EPC | Evolved Packet Core |
| E-SMLC | Evolved SMLC |
| GMLC | Gateway Mobile Location Center |
| GPS | Global Positioning System |
| HLR | Home Location Register |
| LPP | LTE Positioning Protocol |
| LPPa | LPP Annex |
| LTE | Long-Term Evolution |
| MME | Mobility Management Entity |
| MSC | Mobile services Switching Center |
| OTDOA | Observed Time Difference Of Arrival |
| PRS | Positioning Reference Signal |
| PSAP | Public Safety Answer Point |
| RAN | Radio Access Network |
| RB | Resource Block |
| RRC | Radio Resource Control |
| RS | Reference Signal |
| SGSN | Serving GPRS Support Node |
| SLP | SUPL location platform |
| SMLC | Serving Mobile Location Center |
| SUPL | Secure User Plane Location protocol |
| TA | Timing Advance |
| UE | User Equipment |
| UMTS | Universal Mobile Telecommunications System |
| VMSC | Visited Mobile services Switching Center |

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Capability transfer in LTE includes general UE radio access capabilities transferred e.g. over RRC. The UE Radio Capability is not provided directly from one CN node to another. It will be uploaded to the MME when the E-UTRAN requests the UE Radio Capability information from the UE. Some of the UE positioning capability information can be transferred from MME to the positioning node over the SLs interface. SLs is the interface between MIME and the positioning node E-SMLC. The interface is used to convey LCS Application Protocol (LCS-AP) messages between these two nodes. The initiator (MME) of the location service request procedure sends a Location Request message to an E-SMLC associated with the current serving cell for the target UE and starts the timer T3x01. Among the others, the message contains an optional element "UE Positioning Capability (O)". When the UE capability is unknown, the E-SMLC may request UE position capability through LPP. The UE positioning capability provides information about the LCS capabilities of the target UE and comprises only a single information element, LPP Support, which is a mandatory binary indicator (TRUE means the LPP is supported by the UE).

Other UE positioning capability information can be transferred from the UE to the positioning node over the LPP protocol. The requestCapabilities and (provideCapabilities messages in LTE comprise the capabilities for A-GNSS, OTDOA, ECID, as well as common capabilities and epdu capabilities. The OTDOA and ECID requestCapabilities and (provideCapabilities information elements are currently defined as empty sequences. The commonIEsRequestCapabilities/commonIEsProvideCapabilities information element is provided for future extensibility. The epdu-RequestCapabilities/epdu-ProvideCapabilities are defined as an EPDU-Sequence containing information elements that are defined externally to LPP by other organizations, e.g. can be utilized by OMA.

Regarding eNodeB positioning capabilities, the current standard does not specify capability information elements for signaling eNodeB positioning capabilities to E-SMLC over LPPa or via other protocols and interfaces. eNodeB positioning capabilities may also be transferred via O&M system to at least some of the network nodes (the information and its format often are not standardized but defined as a proprietary solution).

As indicated above, with the current standard, UE capability information that can be obtained over the SLs and with LPP is very limited, and the general UE radio access capabilities cannot be transferred to the positioning node at all. Furthermore, the information on eNodeB capability is currently not available in the positioning node either. None of the aforementioned capabilities contain the language information. However, exemplary embodiments recognize that, for example, network positioning equipment needs such functionality, and that language needs to be parameterized in order to make positioning solutions easily deployable everywhere.

It should be noted in exemplary embodiments described herein that the positioning-related message is a message including a positioning information or positioning result, e.g., a message transmitted by a radio node to the UE (e.g. via Radio Resource Control (RRC)), a positioning response transmitted by the positioning node to LCS Client (e.g. via LTE Positioning Protocol (LPP)), a positioning response transmitted by the positioning node to PSAP, a message between positioning node and a translation point, and/or a text message including at least positioning result in non-voice emergency communication. It should further be noted that the terms "civic address information" and "positioning information" as used herein are related in that civic address information is one aspect of positioning information.

Looking now at FIG. 1, the exemplary embodiment depicts the general arrangement of the Location Service feature in a 3GPP network 100 comprising GSM 104, UMTS 106 and LTE 108 here the LCS entities 110, 112, 114 within the Access Network 124 communicate with the Core Network (CN) 102 across the A 116, Gb 118, Iu 120 and S1 122 interfaces. Communication among the Access Network 124 LCS entities 110, 112, 114 makes use of the messaging and signaling capabilities of the Access Network 124. As part of their service or operation, the LCS Clients 130 may request the location information of the UE 126. The LCS clients 130 make their requests to a LCS Server 128. There may be more than one LCS Client 130 and more than one LCS Server 128. The LCS client 130 must be authenticated and the resources of the network must be coordinated including the UE and the calculation functions, to estimate the location and optionally, velocity of the UE 126 and result returned to the LCS client 130. As part of this process, information from other systems (other Access Networks) can be used.

Figure 2:
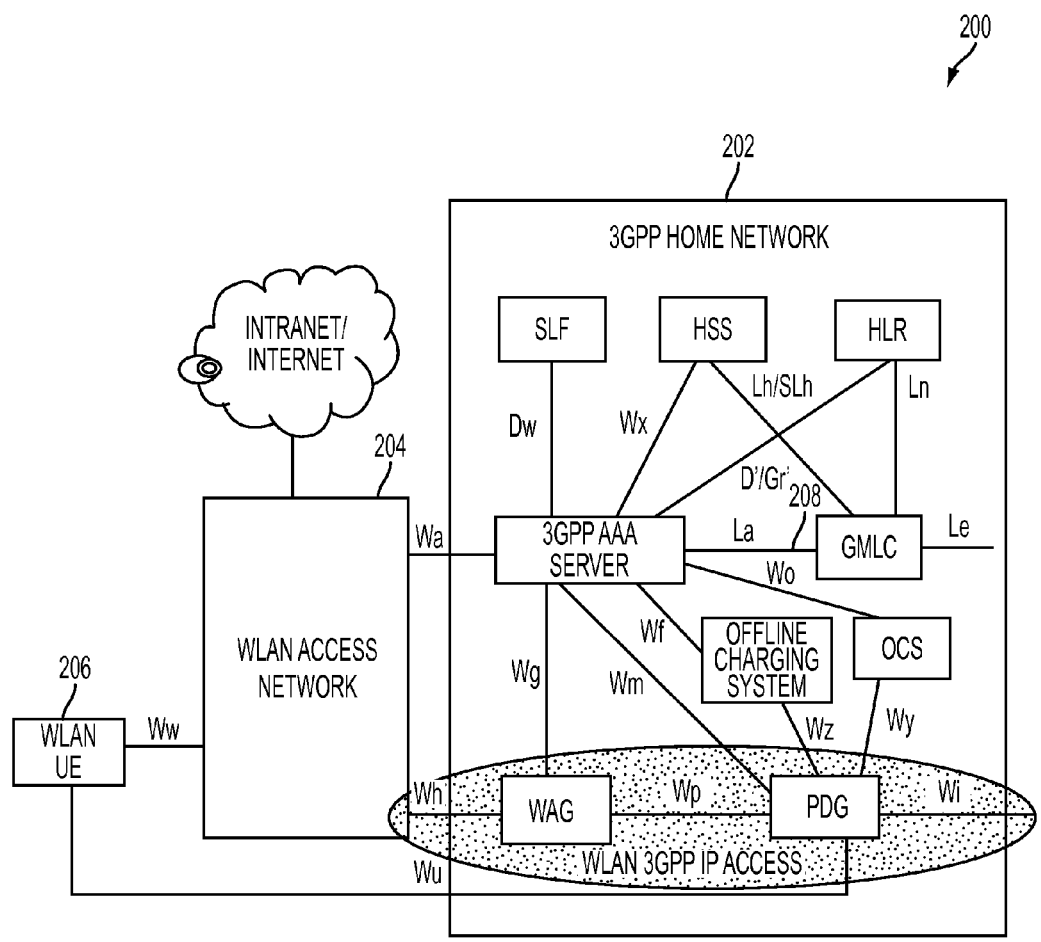
FIG. 2 depicts a general arrangement of an LCS for I-WLAN.

FIG. 2 shows the general arrangement of the Location Service feature in an Interworking WLAN (I-WLAN) 200 illustrating the relation of LCS Clients and servers in the core network 202 with the WLAN Access Networks 204 (e.g., IEEE 802.11). The LCS La interface 208 is added to support LCS for I-WLAN.

The exact positioning procedure flow depends on the origin of the positioning request. In 3GPP networks, the following types of positioning requests (LRs) exist: Network-induced LR (NI-LR), Mobile-terminated LR (MT-LR), and Mobile originating LR (MO-LR), the latter of which is the capability of the mobile station to obtain its own geographical location or have its own geographic location transferred to another LCS client.

Figure 3:
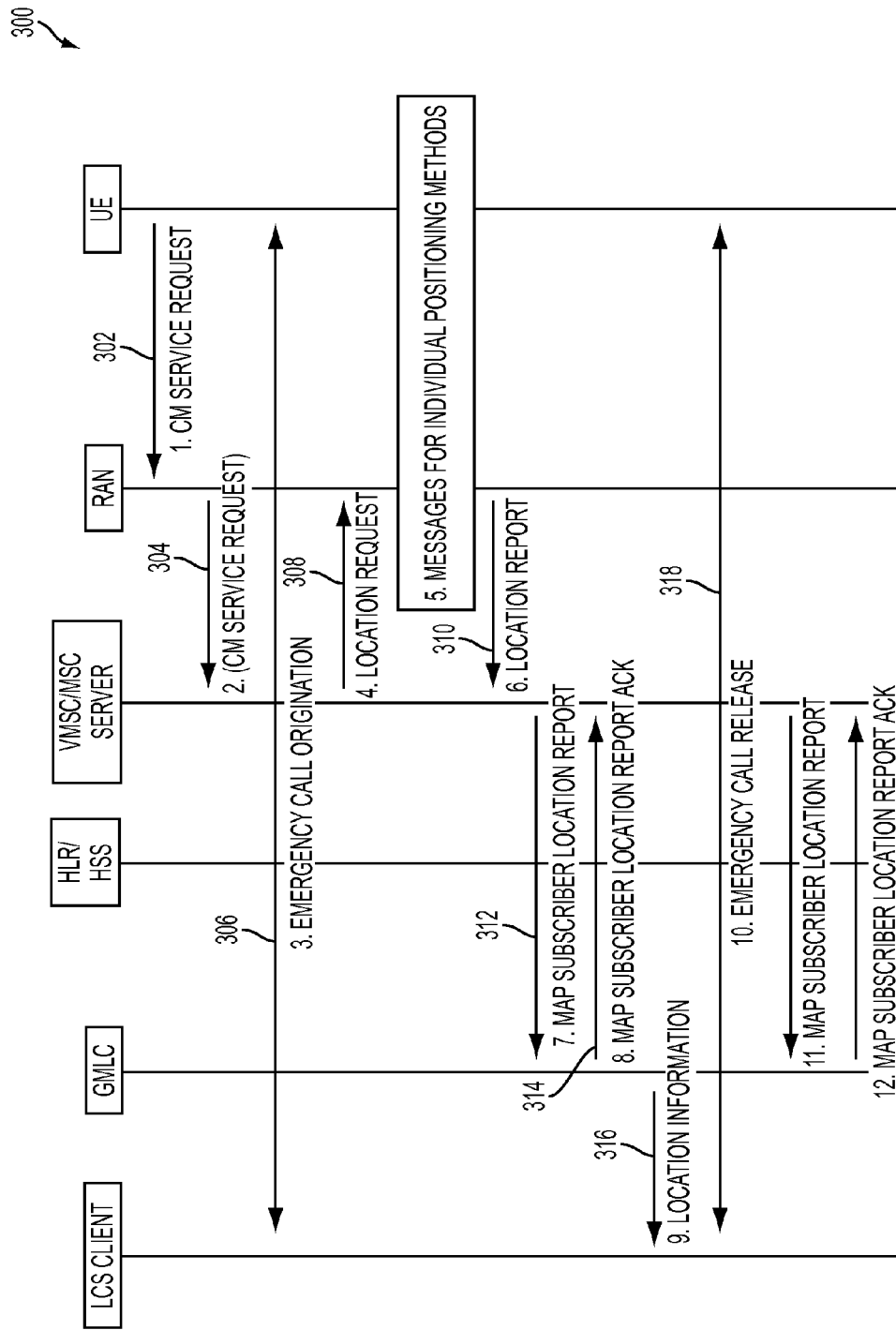
FIG. 3 is a signaling diagram illustrating positioning for a NI-LR emergency service call.
Figure 4:
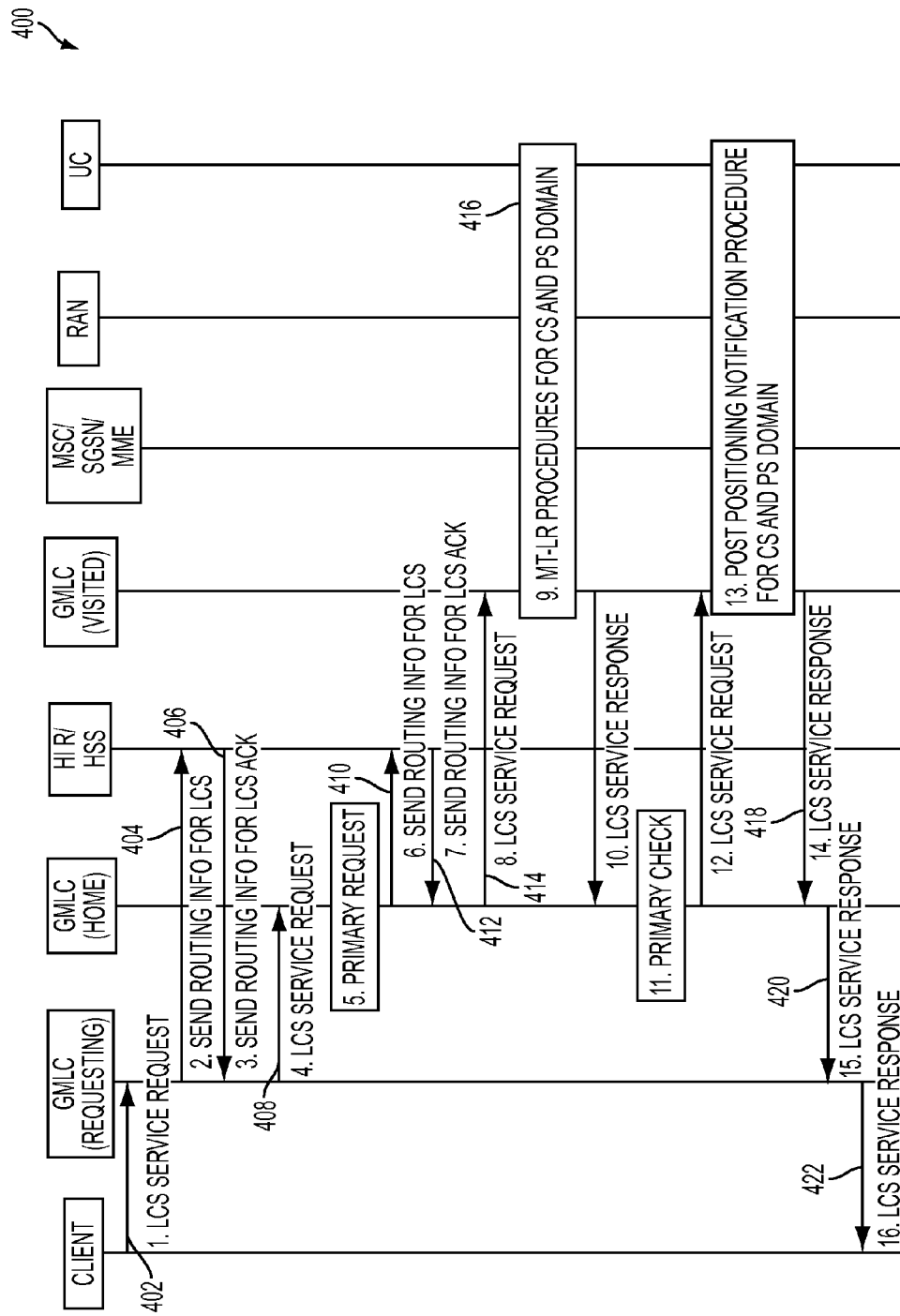
FIG. 4 is a signaling diagram showing general network positioning for a MT-LR for PS and CS domains.
Figure 5:
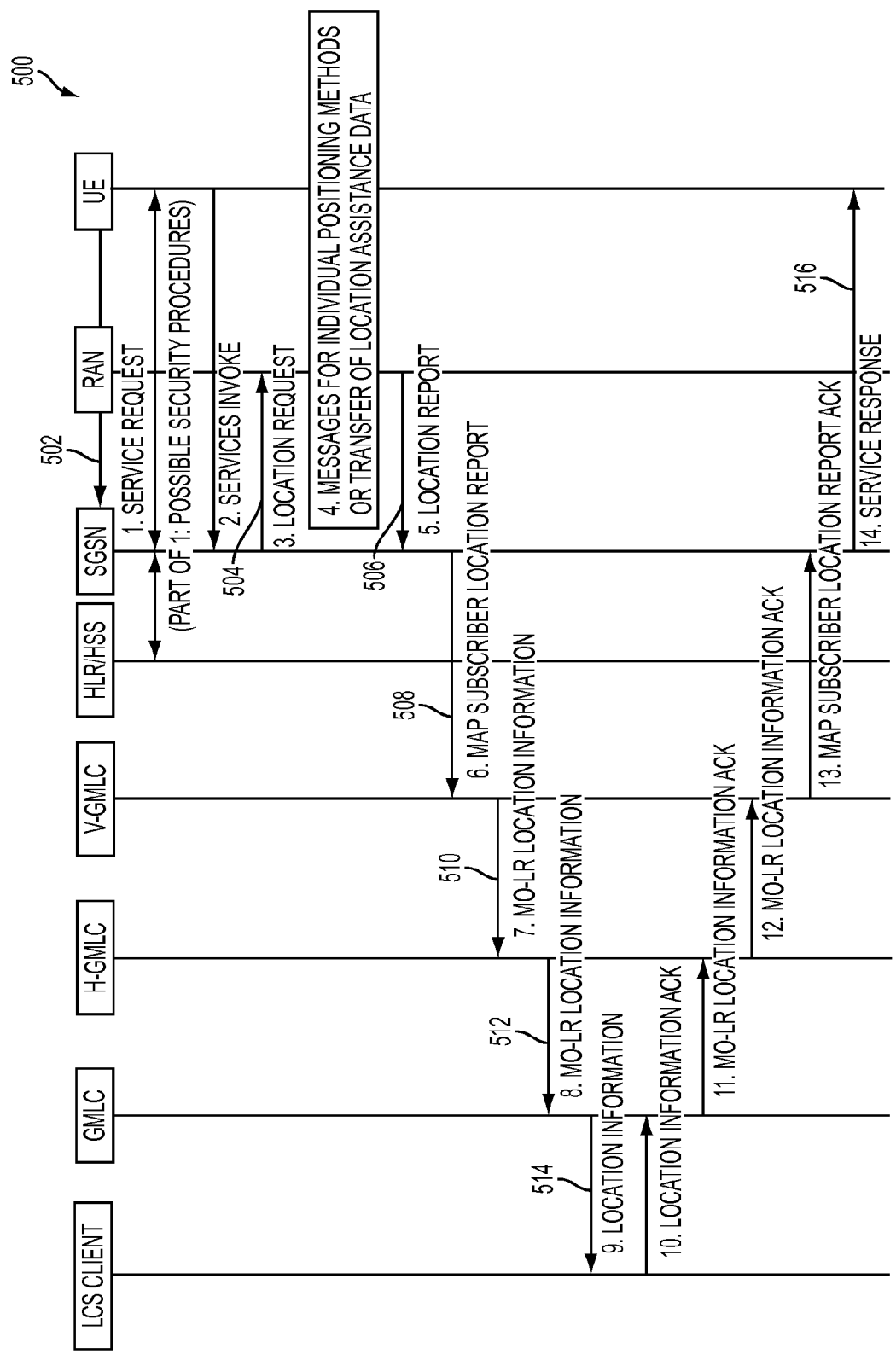
FIG. 5 is a signaling diagram showing general network positioning for packet switched MO-LR.

For context, the positioning architecture and positioning procedures for LTE are described as an example. Many parts of the description are similar for all 3GPP networks. The positioning flow for NI-LR, MT-LR and MO-LR defined for GSM, UMTS and networks are depicted in FIGS. 3, 4 and 5, respectively. The positioning flow defined connection with emergency calls (e.g. in FIG. 3) may have a slightly different flow than in a general case for the same request type. In another aspect of the context for exemplary embodiments, a client transmitting a language capability message to a destination on a wireless network can send the message to plurality of destinations such as, but not limited to, a positioning node in a control plane of the wireless network, a positioning node in the user plane of the wireless network, a GMLC node and/or a MME node on the wireless network.

FIG. 3 illustrates an exemplary embodiment of the NI-LR procedure used to position a UE 126 at the beginning of an emergency call. The VMSC/MSC server in the core network will detect, at step 306, an emergency services flag set by the UE 126 at step 302 and forwarded by the Radio Access Network (RAN) at step 304. The VMSC/MSC server, at step 308, will then send a positioning request to the RAN with a specified Quality of Service. The RAN acts upon the request and, at step 310, passes the results back to the VMSC/MSC sever. The VMSC/MSC server, at step 312 will forward the UE position information to the GMLC and, at step 314 return an acknowledgment to the VMSC/MSC sever. The GMLC, at step 316, will signal the UE 126 position to the LCS client 130 which can be the Emergency Center or Public Safety Answer Point (PSAP). Then, at step 318, the emergency call is released.

FIG. 4 illustrates the MT-LR procedure used by a LCS client 130 to locate a UE 126 during a call. The LCS client, at step 402, sends a positioning request to the GMLC (requesting). The GMLC (requesting) will check with the through the GMLC (home), at steps 404-408, to verify if locations services are allowed for the specific UE and if so, to obtain, at steps 410-412 the address of the serving MSC/SGSN/MME. The GMLC (visited) will then send, at steps 414-416, a positioning request to the serving MSC/SGSN/MME. At step 416, the serving MSC/SGSN/MME forwards the positioning request to the serving RAN. Continuing at step 416, the RAN responds to the serving MSC/SGSN/MME with the UE position and the serving MSC/SGSN/MME forwards the UE position to the GMLC (visited). Next, at steps 418-422, the GMLC (visited) forwards the UE position, through the GMLC (home) and GMLC (requesting) to the requesting LCS client 130.

FIG. 5 illustrates the MO-LR procedure used by an LCS client 130 to request its own location from the network. The UE 126, at step 502, sends a service request through the RAN that is recognized by the serving SGSN/MME. Next at step 504, the serving SGSN/MME sends a positioning request to the RAN. The RAN responds, at step 506, to the serving SGSN/MME with the UE position. The serving SGSN/MME forwards the UE position to the UE, at step 516, and optionally, to an LCS Client 130, at steps 508-514, that was specified in the UE's service request.

Figure 6:
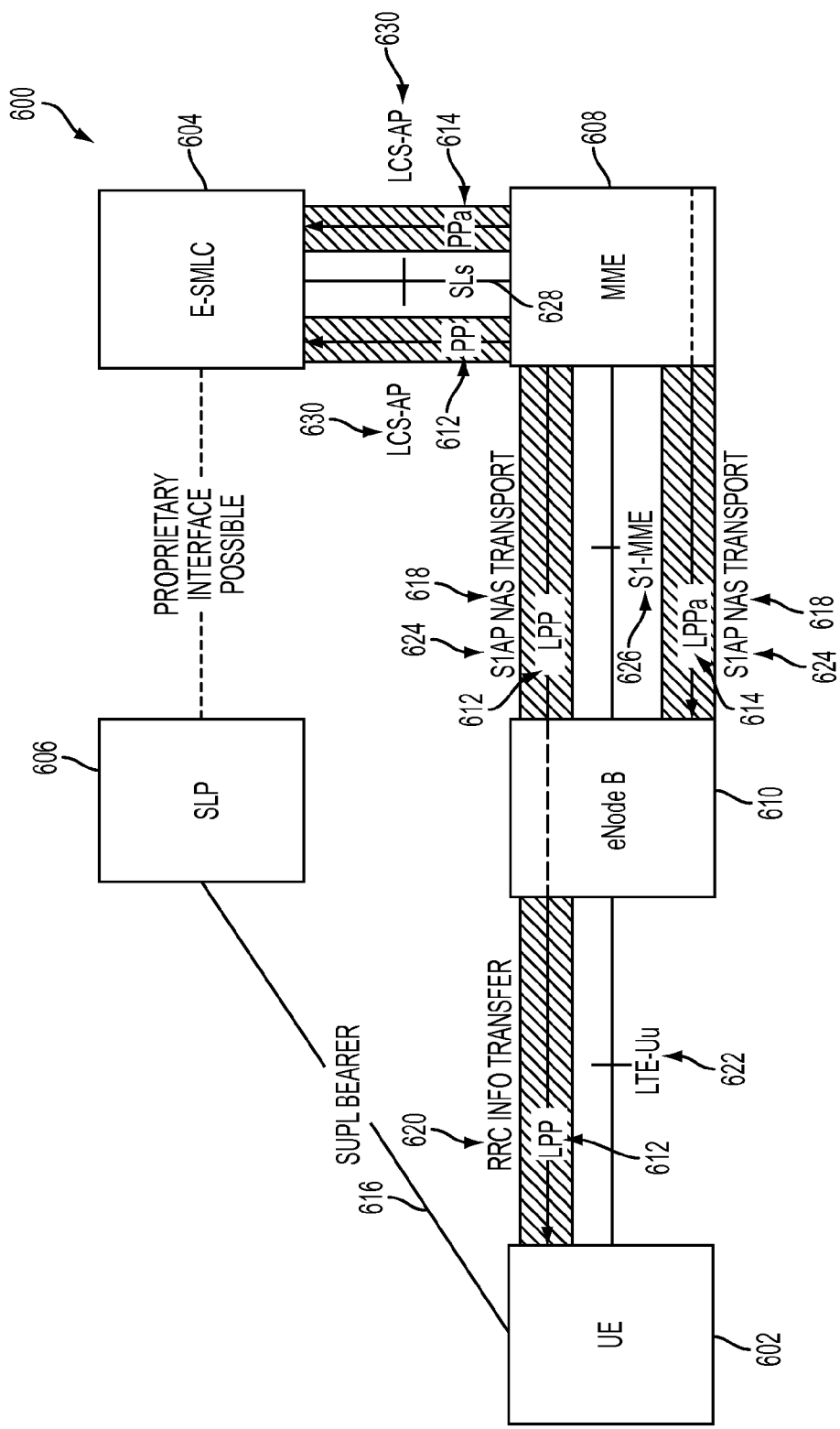
FIG. 6 shows positioning architecture and protocols in E-UTRAN.

FIG. 6 shows the architecture for positioning of a UE 602 with E-UTRAN access, where E-SMLC 604 and SLP 606 are the control-plane positioning node and the SUPL 616 entity responsible for positioning over the user plane, respectively. In the figure, the positioning session is invoked by MME 608 which may either decide to initiate some location service on behalf of a particular target UE 602 (e.g., for an IMS emergency call from the UE 602) or may receive a request from, for example, either the UE 602 at the NAS 618 level, some entity in the EPC (e.g. GMLC), or a radio node (e.g. eNodeB 610). Two positioning protocols are defined for positioning procedures in E-UTRAN: the LTE Positioning Protocol (LPP) 612 and the LPP Annex (LPPa) 614.

LPP 612 is a point-to-point protocol used between a location server and a target device in order to position the target device using position-related measurements obtained by one or more reference sources. For LPP 612 messages, a server could, for example, be an E-SMLC 604 in the control plane or an SLP 606 in the user-plane, while a target could be a UE 602 or SET in the control and user planes, respectively. LPP 612 uses RRC 620 as a transport over the Uu 622 interface between the UE 602 and the E-SMLC 604, S1AP 624 over S1 626 and the SLs 628 interface between the eNodeB 610 and the eSMLC 604. The following transactions have been specified for LPP 612: capability transfer procedure (request/provide messages), assistance data transfer procedure (request/provide messages), and location information transfer (request/provide messages).

The LTE Positioning Protocol Annex (LPPa) 614 is a protocol between the eNodeB 610 and the E-SMLC 604 which conducts the LPPa 614 Location Information Transfer procedures for positioning-related information and LPPa 614 Management procedures not specifically related to LCS.

Signaling service between E-UTRAN and EPC is provided over the S1 626 interface by means of the S1 Application Protocol (S1AP) 624. The S1 626 interface between the eNodeB 610 and the MME 608 is called S1-MME 626 and is utilized in control-plane positioning solutions (see FIG. 6). The SLs 628 interface is standardized between the MME 608 and the E-SMLC 604 with the LCS-AP 630 protocol operating over the interface. The S1 626 interface between the eNodeB 610 and the Serving GW is called S1-U and it is utilized in user-plane positioning solutions (not shown in FIG. 6).

The following location-related procedures are defined for S1AP 624: Location Reporting Control, which allows the MME 608 to request the eNodeB 610 to report the current UE 602 location, with the message LOCATION REPORTING CONTROL; Location Report, by which the eNodeB 610 provides the UE's 602 current location to the MME 608 by using the message LOCATION REPORT; and Location Report Failure Indication, by which the eNodeB 610 informs the MME 608 that a Location Reporting Control procedure has failed, with the message LOCATION REPORT FAILURE INDICATION.

At least the following problems exist when civic address information is introduced for positioning in wireless networks. For E-911 and E-112 positioning emergency positioning), in multi-lingual countries, civic address information may be configured in e.g. home eNodeBs 610 and wireless network nodes using one language, while a preferred, reported language may be another language. For example, this can be expected to occur e.g. in the US (English, Spanish), Canada (French, English), Finland (Swedish, Finnish) and in a number of other countries or regions. There is however no functionality or rules specified today that, for example, specify a field in messages for reporting of the language used for civic address information, specify when, where and how translations are to be performed, specify a set of supported or preferred languages at the terminal and/or at the network side, and exchanging this information between the terminal and network or between network nodes, specify how the preferred language used in the local area is signaled to users, home eNodeBs 610 and wireless network nodes.

Moreover, while roaming, it may be that the UE 602 terminal does not even support the language configured/used for civic address reporting in the serving network or the terminal preferences may not match the set of configured languages in the serving network, i.e. there are missing functionalities that: enable the translation, e.g. over a certain interface of the information at either side or even in separate odes to resolve such conflicts, and specify requirements for the minimum supported set of languages in terminals and networks, at least for emergency services and for PSAP nodes in particular.

For commercial positioning services, in multi-lingual countries and for roaming users, the civic address information preferred by the network may differ from the language capability of the user. There is then no specified functionality today in cellular networks that specifies fields for the languages used for civic address information and for the preferred language of the user in messages and specifies when and where translations are to be performed.

Considering indoor positioning, the civic address reporting concept fails to deliver useful performance unless language information is made available. This, in particular, will become a severe problem for E-911 positioning where new and harder regulatory requirements are now in place.

In any of the circumstances described above, and given problems associated with introducing civic addresses for positioning in wireless networks with the solutions currently being discussed in 3GPP, it is not possible to deliver the civic address information in more than one language and there is currently no translating interface. Moreover, failure reporting is not currently specified for civic address support. These issues, among other things, are addressed by exemplary embodiments described below.

Thus, according to exemplary embodiments, architecture and functionality enhancements for support of using civic address information in the network are provided, e.g., translation points and databases-dictionaries are introduced. Exemplary embodiments augment each civic address information element of positioning messages used in wireless networks, with for example at least one of: the language used by the wireless network for reporting of position results in terms of civic addresses, to emergency positioning centers like E-911 PSAPs and European E-112 centers, a possible other language used for the setup of civic address information, e.g. in case home eNodeBs 610 or wireless network nodes is configured by home users and not the network operator, and the preferred user language for presentation of positioning results, exploiting language, e.g. in terms of civic address information. The presentation of the obtained positioning result exploiting the language information may then be performed in response to a commercial service, on a cell phone or laptop computer.

Exemplary embodiments can also specify "translation" points in the cellular network where civic address information is processed and changed before it is transmitted towards the receiver. This functionality may be similar to a shape conversion for geographical position reporting. Exemplary embodiments can also: update all relevant messages in the wireless networks with language information, provide means for exchanging the information about the supported languages between nodes i.e. related to the capability information, provide means for distribution of the preferred language by the wireless network, e.g. using an augmented broadcast functionality, provide means for signaling of the language actually used and/or preferred for civic address information in a home eNodeB 610 or wireless network node, to the wireless network, provide means for signaling of the used and/or preferred user language, to the relevant nodes of the wireless network, and/or provide a default behavior of a node and the failure signaling support in case of language conflicts when the civic addresses are used in the network. With this functionality, exemplary embodiments enable civic address positioning to be user-friendly and feasible in general multilingual environments.

Among other things, introducing such functionality can involve the introduction of new information elements which are conveyed. For example, exemplary information elements listing the following information are described herein: civic address language(s) of PSAPs (one PSAP may be serving more than one radio network), civic address language of the cellular network (in one embodiment, the cellular network language is the same as the PSAP language used for civic addressing), possibly other language(s) used, e.g. for home eNodeB 610 and WIFI node setup, and preferred language for civic address reporting of position to cell phones and other UEs 602, for commercial services.

According to a first embodiment the language information is collected in an umbrella information element, as depicted in Table 1 below. In a second embodiment the language information is augmented to the civic address format as shown in Table 2 (note that the civic address fields in Table 2 is an example, i.e. other fields may also be envisioned). It is assumed that the civic address information is listed with access node civic address language in case that IE is present, with cellular civic address in case the access node civic address is not present.

TABLE 1

| Field Description | Field Type | Field Presence (optional/mandatory) | Default value |
| --- | --- | --- | --- |
| PSAP civic address language | 32 alpha/numeric | Optional | No data |
| Cellular civic address language | 32 alpha/numeric | Optional | No data |
| Access node civic address language | 32 alpha/numeric | Optional | No data |
| User positioning reporting language | 32 alpha/numeric | Optional | No data |

TABLE 2

| Field Description | Field Type | Field Presence (optional/mandatory) | Default value |
| --- | --- | --- | --- |
| PSAP civic address language | 32 alpha/numeric | Optional | No data |
| Cellular civic address language | 32 alpha/numeric | Optional | No data |
| Access node civic address language | 32 alpha/numeric | Optional | No data |
| User positioning reporting language | 32 alpha/numeric | Optional | No data |
| Apartment/office/ suite number/ floor number | 16 alpha/numeric | Optional | No data |
| Street number | 16 alpha/numeric | Optional | No data |
| Street name | 32 alpha/numeric | Optional | No data |
| City name | 32 alpha/numeric | Optional | No data |
| State/province name | 32 alpha/numeric | Optional | No data |
| Country | 32 alpha/numeric | Optional | No data |
| Postal code | 16 alpha/numeric | Optional | No data |
| Road | 8 alpha/numeric | Optional | No data |
| Comment (for example: "northeast corner outside Bubba conference room") | 64 alpha/numeric | Optional | No data |

Various methods are presented according to exemplary embodiments for delivering the civic address in multiple languages. For example, delivering can comprise receiving mil/ or presenting the civic address information to/at the corresponding protocol layer e.g. Layer 2 or Layer 3 or the application layer. The positioning result in the civic address format may be delivered as a sequence of civic addresses in more than one language, where the sequence may correspond to the preferences and the order of the sequence may correspond to the order of the language priorities. Example:

Location-Civic-Address::=sequence (SIZE (1..maxLanguages)) of Location-Civic-Address, where Location-Civic-Address describes a format such as e.g. Table 2 and by default, maxLanguages can be equal to two.

As an alternative to the option above, the information may be presented in multiple languages (e.g. the local language and the native language) although being received by the node only in one language (e.g. local language). This may be implemented by means of translation interfaces and translation nodes maintaining the corresponding databases (in one embodiment all these functionalities may be implemented as a software interface in a single node, e.g. UE, designed between the obtained signaling result and the application). Language translation points are described in more detail below.

If any of the four, for example, language information elements shown in Table 1 differ, translation may be required. For example, some cases where translation may be needed include 1) translation from access node civic address language to cellular civic address language—e.g. for E-911 and E-112 reporting and for translation to geographical reporting formats, typically multi-lingual regions; 2) translation from cellular civic address language to user positioning reporting language, typically for commercial services in multi-lingual regions and for roaming users; and 3) translation from the PSAP civic address language to PSAP civic address language.

Such translation requires translation software that may be a part of a cellular node, a standalone node or even an internet service. A translation point may use a special database, e.g. a 'dictionary' with a set of pre-defined mapping between different parts of the address on one language and their equivalent in another language, which may or may not be maintained by the same node, but to which the node has an interface. The translation may be into one or more languages, e.g. depending on preferences or the translation interface configuration. The listed translation points represent different possible embodiments and shall not be viewed as the limiting the scope of the invention.

In one embodiment, the default language is one per country and translation is used to translate to any other language, according to e.g. application request, user preferences, etc. In another embodiment, language configuration, preferences, their default setting are the LCS Client properties, which may be the same for all LCS Clients associated with the same PSAP. And the language may be the same as the language used by PSAP. In another embodiment, the supported/preferred language of the LCS Client is obtained by the positioning node, in unsolicited way, e.g. together with the positioning request, or upon request.

Considering LTE, the translation points for translation from access node civic address language to cellular civic language may include, for example, one or more of the following nodes of UE, LCS Client, Radio Network Node (e.g., eNode), control-plane positioning node (E-SMLC preferred), user-plane positioning platform (e.g., SLP), MME, GMLC (not LTE-specific i.e. valid also for other RATs even if not mentioned in connection with the other RATs in the next sections), PSAP (not LTE-specific i.e. valid also for other RATs even if not mentioned in connection with the other RATs in the next sections). Similarly, the translation points in an LTE system for translation from cellular civic address language to user positioning reporting language may include one or more of the following nodes of UE, LCS Client, Radio Network Node (e.g., eNodeB or home eNodeB), control-plane positioning node (e.g., E-SMLC preferred), GMLC, user-plane positioning platform (e.g., SLP). The translation functionality may also reside in a separate physical or logical entity and may have an interface to any of the above nodes.

The translation points in LTE between cellular civic address language and PSAP civic address language may include one or more of the following nodes of UE, LCS Client, Radio Network Node (e.g., eNodeB or home eNodeB), GMLC, control-plane positioning node (e.g., E-SMLC preferred), user-plane positioning platform SLP). Considering, alternatively, a WCDMA system, the translation points for translation from access node civic address language to cellular civic language can include one or more of the following nodes of UE, LCS Radio Network Node (e.g., NodeB or home BS or RNC with control-plane RNC preferred), control-plane network node, (SAS with control-plane SAS centric preferred), MSC/SGSN, GMLC, user-plane network node (SLP). The translation points for translation from cellular civic address language to user positioning reporting language in a WCDMA system can include one or more of the following nodes of UE, LCS Client, Radio Network Node (e.g., NodeB or home BS or RNC with control-plane RNC centric preferred), control-plane network node, (SAS with control-plane SAS centric preferred), MSC/SGSN, GMLC, user-plane network node (SUPL location platform, SLP).

Likewise, the translation points between cellular civic address language and PSAP civic address language in a WCDMA system may include one or more of the following nodes of UE, LCS Client, Radio Network Node (eNodeB), Radio Network Node (RNC with control-plane RNC centric preferred), control-plane network node, (SAS with control-plane SAS centric preferred), MSC/SGSN, user-plane network node (SUPL location platform, SLP). The translation functionality may also reside in a separate physical or logical entity and may have an interface to any of the above nodes.

Similarly, for a GSM system, the translation points for translation from access node civic address language to cellular civic language can include one or more of the following nodes of UE, LCS Client, Radio Network Node (RBS), Network Node (BSS), control-plane network node (SMLC, control-plane preferred), MSC/SCGN, GMLC, user-plane positioning platform (SLP). The translation points for translation from cellular civic address language to user positioning reporting language in a GSM system can include one or more of the following nodes of UE, LCS Client, Radio Network Node (RBS), Network Node (BSS), control-plane network node (SMLC, control-plane preferred), MSC/SGSN, GMLC, user-plane positioning platform (SLP). The translation points between cellular civic address language and PSAP civic address language in a GSM system may include one or more of the following nodes of UE, LCS Client, Radio Network Node (RBS), Network Node (BSS), control-plane network node (SMLC, control-plane preferred), MSC/SGSN, user-plane positioning platform (SLP). The translation functionality may also reside in a separate physical or logical entity and may have an interface to any of the above nodes.

Exemplary translation points for a CDMA2000 include the UE, BSS, MSC, MPC, LCS Client, user plane nodes, e.g. SLP.

There may be a common entity utilized for more than one RAT, e.g. a translation point may reside in a radio base station and the radio base station is multi-RAT supporting multi-radio standard. Since the civic address information as such is RAT-agnostic, it is reasonable to have a common entity operating across several RATs or used by several RATs, e.g. database-dictionary may be accessed by any RAT. It is also natural to have such multi-RAT entities managing or handing civic address information (creating, translating, signaling, etc.) interfacing with either all the RATs or a node that has interfaces to all the RATs (e.g. GGSN or GMLC). Herein, at least some embodiments are described for several RATs, e.g. LTE FDD and TDD, CDMA2000, GSM, WCDMA, but the invention is not limited to this set of RATs. It may also apply to, for example, WLAN, WiMAX and other radio access technologies.

Language-related information is the information describing the language property of some contents, e.g. civic address information. Above, it has been proposed, e.g. that the civic address information used in a wireless network is augmented with at least one language-related field indicating the language used for the address in a given IF (e.g. 'Access node civic address language' field in the example for Table 2). With this language-related information, the receiving side is at least aware of the language used for the given address information. However, to generate a civic address in the right language and to ensure that the information can be properly interpreted and understood at the target that the functionality would be improved if (optionally) network nodes, including terminals, exchange their language capabilities.

For example, in one embodiment of the current invention, a node sends an indication describing the set of supported languages, e.g. in LIE the following interfaces may be involved: UE→E-SMLC, UE→eNodeB, eNode→eNodeB, eNodeB→E-SMLC, LCS Client→E-SMLC (e.g., via MME), eNodeB→eNodeB, UE→UE, etc. Note that the signaling here and also other parts of the invention may be either via physical or logical links (e.g., via, higher layer protocols which may be transmitted transparently via other intermediate nodes such as MME for LPP). In another embodiment, the language capability is included in a capability report upon a request from another node, where the request may include an indication of whether the language capability shall or shall not be included (e.g. this field may be used in connection with a positioning method which utilizes civic address information). The language capability may be a part of general node and/or network capabilities or positioning capabilities or specific positioning method capabilities and configurations.

According to other exemplary embodiments, which may also include exchanging language capabilities, network nodes, including terminals, exchange their language preferences. The preference may comprise one language or a few languages, given in the order of priority. In one embodiment of the current invention, a node sends an indication describing the set of preferred language(s). In another embodiment, the language preference is included in a preference or capability report upon a request from another node, where the request may include an indication of whether the language preference shall or shall not be included. The language preferences may be a part of general node and/or network configuration and may also be associated with positioning configuration or specific positioning method configuration.

The language-related information is preferably communicated together with the contents (civic address), but not necessarily. With or without civic address, the language-related information may be communicated via dedicated signaling, e.g. on request or event-triggered, or via broadcast. In one embodiment, the language-related information is taken into account in the positioning method selection, e.g. the network shall not provide results in the civic-address format if e.g. it cannot deliver the result in the language indicated in the positioning request.

In certain cases, e.g. when the UE is performing or controlling translation services, the cellular civic address language should be made available in the LIE. There are, for example, at least two possible embodiments for this exemplary embodiment. First, inclusion of the cellular civic address language in messages carrying the positioning result to the UE (Table 1 or Table 2) can be performed. It is also possible (not preferred) to transmit a separate message with this information. The UE will then need to perform its own translation with any of the means disclosed above. Second, broadcast of the cellular civic address language. This requires an augmentation of the broadcast messages.

The cellular network preferred language may be obtained e.g. via the positioning node or the radio base station. The signaling path depends on the node that maintains the cellular network language-related information. The information may also be signaled in a transparent container, i.e. transparent to some nodes. For example, E-SMLC may receive this information from another network node and transparently, unchanged, passes to the UE. Or a serving home eNodeB receives this information from a macro cell and passes it as it is unchanged to the UE, which may be beneficial if the passing radio nodes are not operator deployed nodes and thus may or may not be fully trusted and allowed to access e.g. configuration information related to capabilities or personal configuration.

In LTE, LPP can be used between UE and E-SMLC if the language-related information is to be distributed to the UE after the LIT session has been established or otherwise over UE-dedicated, UE group dedicates or broadcast RRC signaling. The positioning node can have the information configured or otherwise could request from another network node e.g. O&M, MME over LCS-AP or eNodeB over LPPa. The cell-specific information can also be broadcasted in e.g. one of the System Information Blocks periodically broadcasted over the cell using BCCH logical channel.

The involved interfaces in LTE may include, but are not limited to E-SMLC→eNodeB (e.g. over LPPA), eNodeB→E-SMLC (e.g. over LPPa), eNodeB→UE (e.g over RRC), E-SMLC→UE (e.g. over LPP), GMLC→E-SMLC, donor-cell→relay, relay→donor-cell, home eNodeB→home eNodeB gateway, home eNode gateway→eNodeB, O&M→E-SMLC, O&M→eNodeB and UE→UE. The involved interfaces in WCDMA may include, but are not limited to SAS→RNC (over PCAP), RNC→SAS (over lupc), RNC→NodeB (over NBAP), NodeB→RNC (over NBAP), RNC→UE (over RRC), UE→RNC (over RRC), GMLC→SAS, SAS→GMLC, donor-cell→relay, relay→donor-cell, home NodeB→home NodeB gateway, home NodeB gateway→home NodeB, O&M→SAS, SAS→O&M and UE→UE. The involved interfaces in GSM and CDMA 2000 are the interfaces serving similar purposes as the interfaces for LTE and WCDMA.

The address information may be configured in a radio node. A translating interface may be used to translate e.g. from the user interface to the language used in the network. Further, the language-related information, with or without civic address, is distributed e.g. upon an event (e.g. configuration changed in the radio mode), on request or via broadcast. The protocols and interfaces involved LTE can be but are not limited to eNodeB→E-SMLC (e.g. over LPPa), eNodeB→UE (e.g. over RRC), eNodeB→MME (over S1AP via S1-MME interface), eNodeB→eNodeB (e.g. over X2), donor cell→relay and home eNodeB→home eNodeB gateway. The protocols and interfaces involved in WCDMA can be but are not limited to NodeB→RNC (over NBAP)→SAS (over lupc), RNC→UE (over RRC), NodeB→RNC (over NBAP)→NodeB (over NBAP), donor cell→relay and home eNodeB→home eNodeB gateway. The involved interfaces in GSM and CDMA 2000 are the interfaces serving parallel purposes as the interfaces for LTE and WCDMA.

It is one embodiment of the current invention that in case of the civic address information is received in a language which is not supported, a binary failure indicator is transmitted at least to the node from where the information is delivered, e.g. positioning node. In another embodiment, the failure indicator is descriptive, e.g. sending a 'language not supported' message may be triggered. Also, a list of supported languages may be attached in that case. There may also be a pre-defined decision to not run the civic address based positioning if the there is no match between the languages at both sides. In one embodiment, a positioning result on the geo format may be generated and transmitted instead.

In one embodiment, a minimum set of languages shall be supported by network nodes, e.g. two languages for PSAP.

The advantages of the above-described exemplary embodiments can, for example, be summarized as 1) For E-911 and E-112 positioning, the exemplary embodiments are a necessary enabler along country border areas or in multi-lingual countries like the US, Canada, Finland, and others; 2) The exemplary embodiments make it possible for users to configure access points with their home language; 3) For commercial services the exemplary embodiments make sure that each user can receive positioning results expressed as civic addresses in his/her preferred language; and 4) Ensuring the correct performance of important RAT-agnostic positioning method (civic address based positioning).

Figure 7:
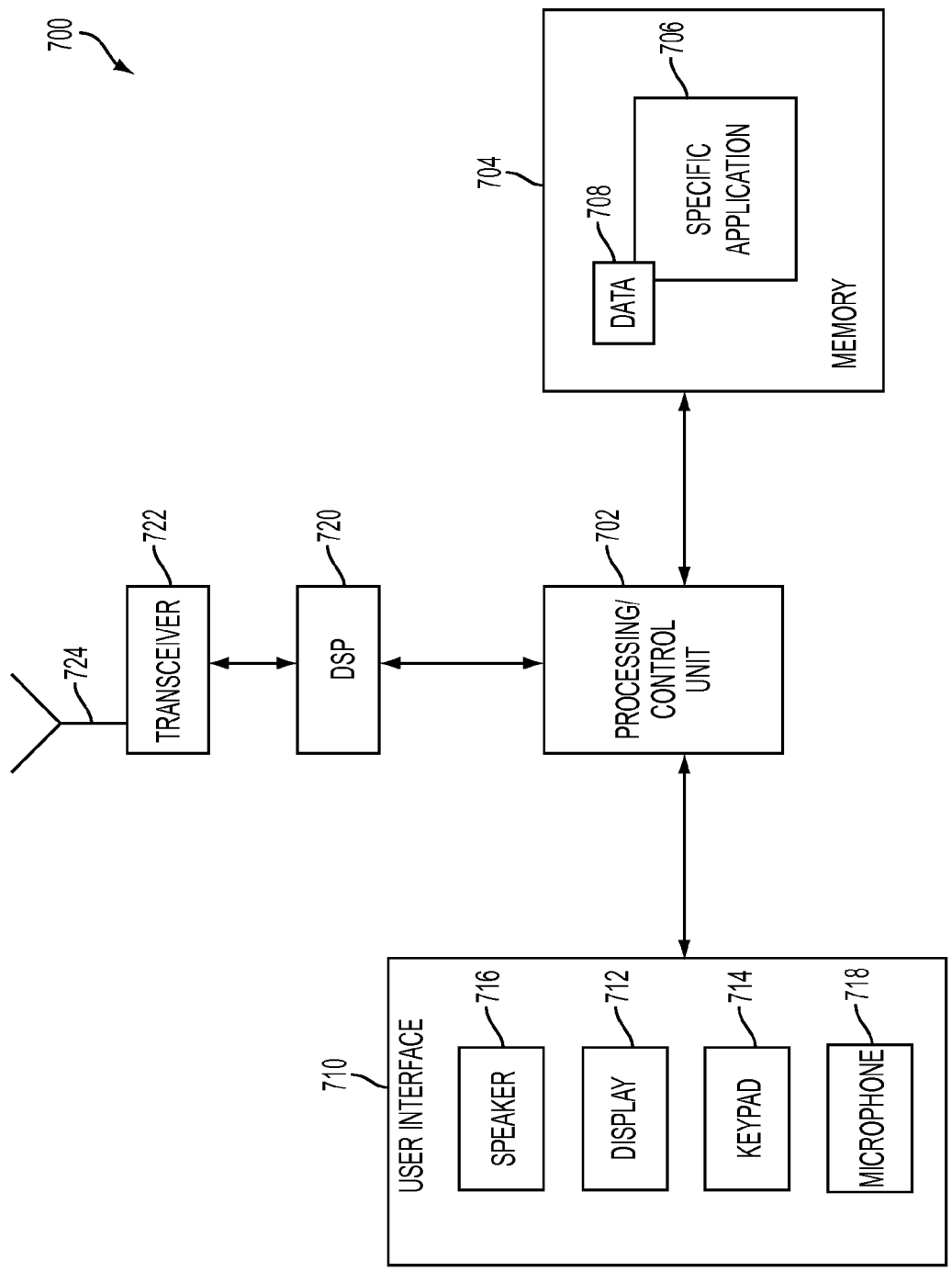
FIG. 7 illustrates an exemplary end user terminal.

It will be appreciated that providing the capability to implement language dependent positioning and signaling as described above will impact many of the nodes in a communication system including, for example, an end user terminal. For purposes of illustration and not of limitation, an example of a representative end user terminal device capable of carrying out operations in accordance with the exemplary embodiments is illustrated in FIG. 7. It should be recognized, however, that the principles of the present exemplary embodiments are equally applicable to other terminal devices. The exemplary end user terminal device 700 may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor.

The processing unit 702 may control the basic functions of the end user device as dictated by programs available in the storage/memory 704. Thus, the processing unit 702 may execute the functions associated with exemplary embodiments described above. More particularly, the storage/memory 704 may include an operating system and program modules for carrying out functions and applications on the end user terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the end user terminal computing arrangement 700 via data signals, such as being downloaded electronically via a network, such as the Internet.

One of the programs that may be stored in the storage/memory 704 is a specific application program 706. As previously described, the specific program 706 may interact with the user to enable, for example, language preference information to be exchanged with the network, e.g., in the context of positioning. The specific application 706 and associated features may be implemented in software and/or firmware operable by way of the processor 702. The program storage/memory 704 may also be used to store data 708, such information associated with language preference and/or capability as described above, or other data associated with the present exemplary embodiments. In one embodiment, the application program 706 may also perform translation of the obtained positioning information, e.g., received from the network, to the supported or preferred by the client language. In one exemplary embodiment, the programs 706 and data 708 are stored in non-volatile electrically-erasable, programmable ROM (EEPROM), flash ROM, etc. so that the information is not lost upon power down of the end user terminal 700.

The processor 702 may also be coupled to user interface elements 710 associated with the end user terminal. The user interface 710 of the terminal may include, for example, a display 712 such as a liquid crystal display, a keypad 714, speaker 716, and a microphone 718. These and/or optionally other user interface components are coupled to the processor 702. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism suitable to implement, e.g., the above-described end user interactions.

The end user terminal 700 may also include a digital signal process (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. If the end user terminal is a wireless device, a transceiver 722, generally coupled to an antenna 724, may transmit and receive the radio signals associated with the wireless device.

The mobile computing arrangement 700 of FIG. 7 is provided as a representative example of a computing environment in which the principles of the exemplary embodiments described herein may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It should be appreciated that the principles of the present exemplary embodiments are equally applicable to non-mobile terminals, i.e., landline computing systems.

In addition to end user terminals, exemplary embodiments also impact network nodes mentioned above and FIG. 8 provides an exemplary representation thereof. Therein, node 800 includes a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like.

The node 800 may also include one or more data storage devices, including hard and floppy disk drives 812, CD-ROM drives 814, and other hardware capable of reading and/or storing information such as DVD, etc. In one embodiment, software for carrying out the above discussed steps and signal processing may be stored and distributed on a CD-ROM 816, diskette 818 or other form of media capable of portably storing information. These storage media may be inserted into, and read by, devices such as the CD-ROM drive 814, the disk drive 812, etc. The node 800 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The node 800 may be coupled to other computing devices or network nodes, such as the landline and/or wireless terminals and associated watcher applications, via a network. If the node is, e.g., an eNodeB, it will also include one or more antennas and a wireless transceiver configured to transmit and receive signals over e.g., one or more standardized air interfaces. The node 800 may be part of a larger network configuration as in a global area network (GAN) such as the Internet 824, which allows ultimate connection to the various end user devices, e.g., landline phone, mobile phone, personal computer, laptop, etc.

Figure 9:
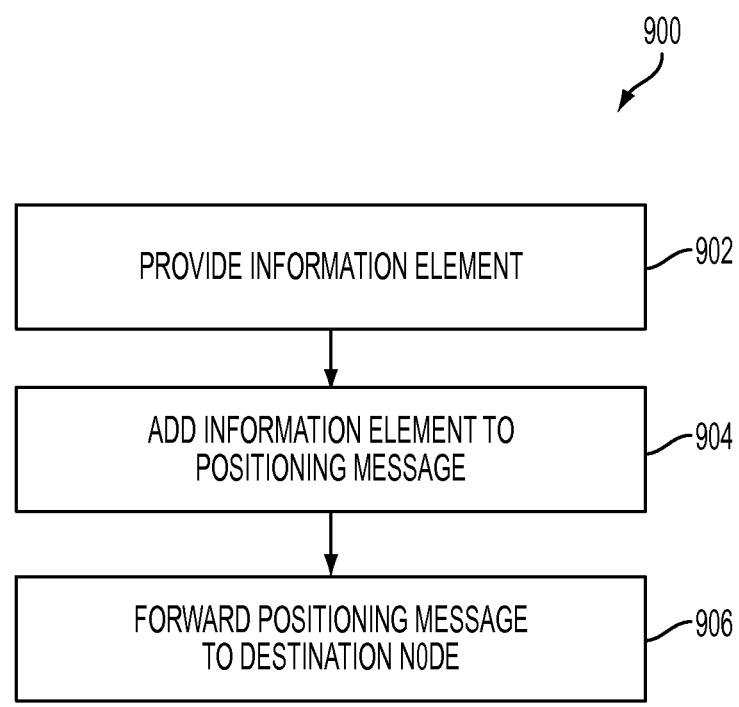
FIG. 9 is a flowchart depicting a method for providing an information element to a message and forwarding the message towards the message destination node.

Looking now at FIG. 9, an exemplary method embodiment 900 for providing an information element to a positioning message is depicted. Beginning at step 902, the exemplary method embodiment provides an information element to the positioning message. In this exemplary embodiment the positioning message includes the civic address of the user equipment or of the local station providing the user equipment access to the wireless network. It should be noted in the exemplary embodiment that the local station can be a network device such as a home eNodeB/wireless network node. Continuing with one aspect of the exemplary embodiment, the information element specifies the language of the civic address data in the message. In another aspect of the exemplary embodiment, the information element can be a translated version of the civic address, translated to a language required or preferred by the destination of the message. In one exemplary embodiment, the destination of the message can be an Emergency 911 station that requires the English language and the language provided by the user equipment or the eNodeB/wireless network station is Spanish.

Continuing at step 904 of the exemplary, embodiment, the information element is added to the positioning message. In one aspect of the exemplary embodiment, the method can add a language data type identifier that specifies the language of the civic address of the positioning message as provided by the user equipment or the eNodeB/wireless network device. In another exemplary method embodiment, the method can translate the civic address in the positioning message and replace the provided civic address with the translated civic address. In yet another exemplary embodiment, the method can add a translated version of the civic address to the positioning message based on the default language of the location or can add a series of translated civic addresses to the positioning message based on the number of languages supported by the network.

Next, at step 906, the exemplary method embodiment forwards the positioning message towards the destination node. It should be noted in the exemplary embodiment that the message can travel through other translation nodes before reaching the destination node and accordingly other translations of the civic address in the positioning message can occur.

Figure 10:
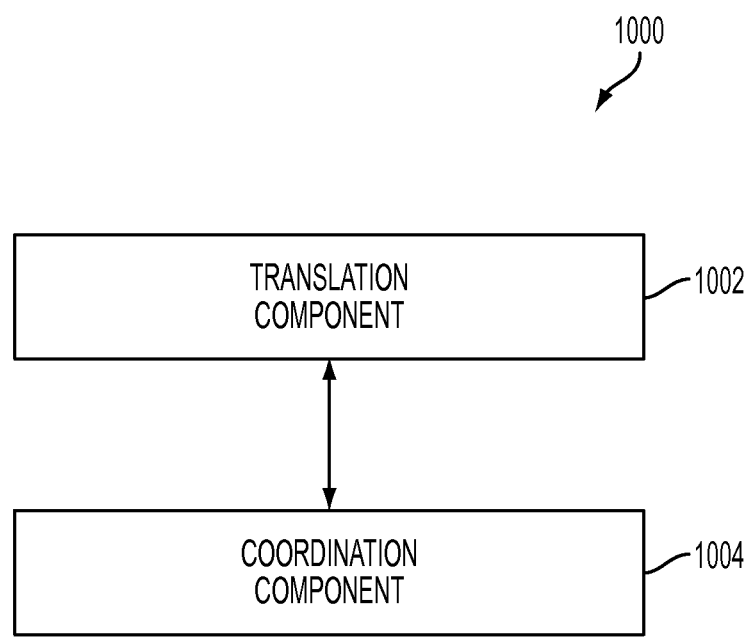
FIG. 10 depicts a system for augmenting a positioning message with an information element associated with the language of the civic address of the positioning message.

Turning now to FIG. 10, a diagram of a translation node system 1000 for providing an information element to a positioning message is illustrated. The exemplary embodiment of the translation node system 1000 includes but is not limited to an exemplary translation component 1002, and an exemplary coordination component 1004. It should be noted in this exemplary embodiment that many translation nodes can be located throughout the wireless network. In one exemplary embodiment, translation nodes can be located at geographical boundaries between areas that coincide with different default or preferred languages. In another exemplary embodiment, translation nodes can be located at sites such as Emergency-911 locations or commercial service provider locations.

Continuing with the exemplary embodiment, a translation component 1002 can process a positioning message passing through the node and add the information element to the positioning message. In this exemplary embodiment, the information element can be a parameter specifying the language of the civic address in the message that the translation component 1002 adds to the positioning message. In another aspect of the exemplary embodiment, the translation element can be a translation of the civic address from the language provided in the message to a language required or preferred by the wireless network and place in the positioning message by the translation component 1002. In a further aspect of the exemplary embodiment, the translation component 1002 can provide a series of translated civic addresses based on the requirements or preferences of the wireless network or the destination address of the positioning message. It should be noted in the exemplary embodiments that the translation component 1002 can reside in a single node of the wireless network or it can be distributed around the network. In another aspect of the exemplary embodiment, the translation component 1002 can request translation services from locations communicatively connected to the translation component 1002 but not located on the wireless network.

Continuing with the exemplary embodiment, the coordination component 1004 provides the capability to collect information from the wireless network related to the language specifications of the various nodes of the wireless network. In this exemplary embodiment, the specifications can include the languages supported by the node and any preferred or required translating capabilities of the node or destinations service by the node. In another aspect of the exemplary embodiment, the coordination component 1004 maintains storage for the language information collected from the wireless network.

Figure 11:
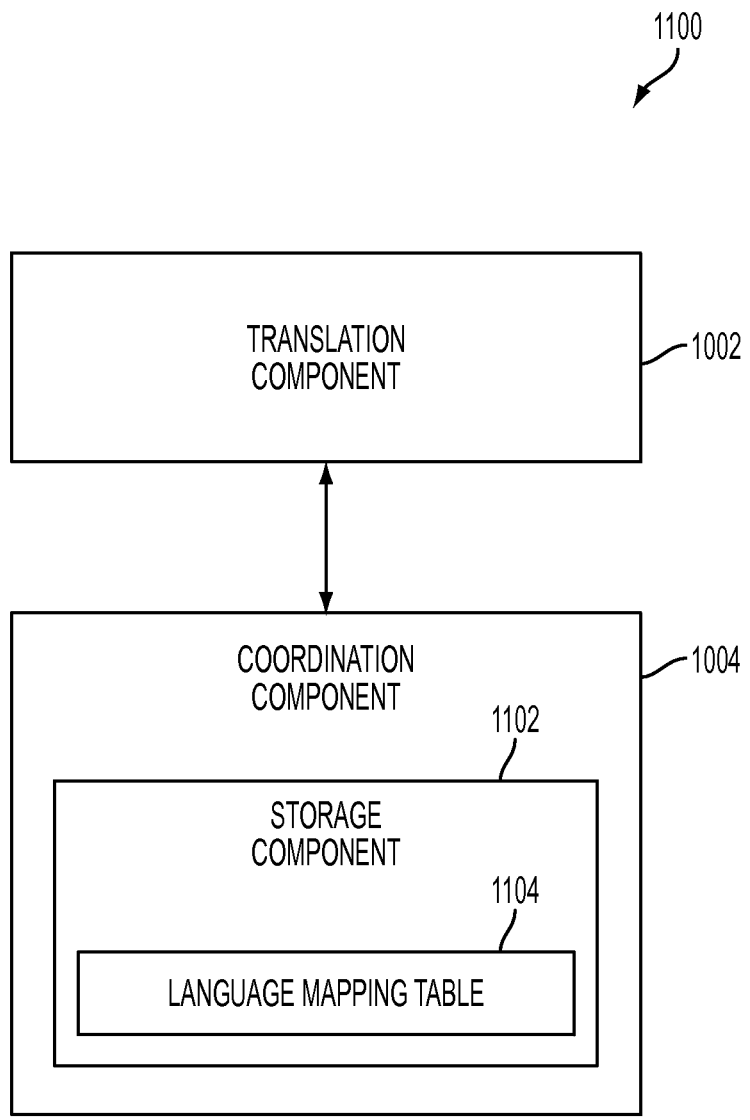
FIG. 11 depicts a system for augmenting a positioning message with an information element associated with the language of the civic address of the positioning message including a language mapping table for storing information associated with the language requirements of the wireless network.

Looking now at FIG. 11, a diagram of a translation node system 1100 for providing an information element to a positioning message is illustrated. The exemplary embodiment of the translation node system 1100 includes but is not limited to a storage component 1102 of the coordination component 1004 and a language mapping table 1104 of the storage component 1102. The storage component 1102 of the exemplary embodiment provides for maintaining information associated with the language requirements of the different areas of the wireless network. In the exemplary embodiment, the coordination component 1004 collects the language information from translation nodes located around the wireless network and provides the information to the storage component 1102. Continuing with the exemplary embodiment, the storage component 1102 organizes the language information in a language mapping table 1104. The language mapping table 1104 of the exemplary embodiment allows the coordination component 1004 to provide the translation component information associated with making a translation of the civic address information of the positioning message before forwarding the positioning message towards its destination.

In addition to end user terminals and servers, systems and methods for processing data according to exemplary embodiments of the present invention can be implemented as software, e.g., performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device cat be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations as captured via events and/or data. Captured data and events can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The invention claimed is:

1. A method for transmitting a positioning-related message in a wireless network, said method comprising:
   obtaining, by a node in the wireless network, information associated with a language capability of at least one of a plurality of destinations;
   generating, by said node and based on said obtained language capability, positioning information for said positioning-related message, and
   transmitting, by said node, said positioning-related message including said positioning information toward said at least one of a plurality of destinations associated with said wireless network,
   the method further comprising:
   receiving, by said node, a request for location information of a target device, from a client;
   collecting, by said node, said positioning information associated with a geographical location of said target device;
   translating, by said node, said positioning information into a language according to said language capability; and
   generating, by said node, a reply to said request for location information as the positioning-related message including the translated positioning information wherein said step of generating said positioning information includes an information element in said positioning-related message which specifies a language associated with said positioning information contained in said positioning-related message.

2. The method of claim 1, wherein said step of obtaining further comprises:
   receiving, by said node, said information over an interface communicatively connected to said node.

3. The method of claim 1, wherein said positioning information is augmented with language information that comprises at least one of:
   a specification of a Public Safety Answer Point (PSAP) positioning information language;
   a specification of a cellular positioning information language;
   a specification of a access node positioning information language; and
   a specification of a user positioning reporting language.

4. The method of claim 3, wherein said positioning information further comprises at least one of:
   a street address;
   a street name;
   a city name;
   a state or province name;
   a country name;
   a postal code;
   a road name; and
   a comment.

5. The method of claim 4, wherein said street address further comprises a unit address for a multi-unit building associated with said street address.

6. The method of claim 1, wherein said wireless network is configured to have a preferred language.

7. The method of claim 1, wherein said client is said target device.

8. The method of claim 1, wherein said positioning information is translated to a language specified by a Public Safety Answer Point (PSAP).

9. The method of claim 1, wherein said language is specified by said target device.

10. The method of claim 1, wherein said wireless network further comprises translation nodes where said positioning information is translated to one of a plurality of languages associated with said translation node before transmitting said reply towards said client.

11. The method of claim 10, wherein said wireless network is a Long-Term Evolution (LTE) network and said translation nodes comprise at least one of a user equipment (UE) node, a location services (LCS) client node, a Public Safety Answer Point (PSAP) node, a radio network node comprising at least one of an Evolved Node B (eNodeB) radio network node and a radio base station supporting multiple radio access technologies, a network node comprising an Evolved Serving Mobile Location Center (E-SMLC) control-plane positioning node, a user-plane positioning platform node comprising a Service Location Protocol (SLP) node, and a Gateway Mobile Location Center (GMLC) node.

12. The method of claim 10, wherein said wireless network is a Wideband Code Division Multiple Access (WCDMA) network and said translation nodes comprise at least one of a user equipment (UE) node, a location services (LCS) client node, a Node B (NodeB) radio network node, a Radio Network Controller (RNC) control-plane node, a Stand Alone Serving Mobile Location Center (SAS) node, a Mobile services Switching Center (MSC)/Serving General packet radio service Support Node (SGSN) node, a Gateway Mobile Location Center (GMLC) node and a user plane network node comprising a Service Location Protocol (SLP) node.

13. The method of claim 10, wherein said wireless network is a Global System for Mobile Communications (GSM) network and said translation nodes comprise at least one of a user equipment (UE) node, a location services (LCS) client node, a Radio Base Station (RBS) radio network node, a Base Station Subsystem (BSS) network node, a Serving Mobile Location Center (SMLC) control-plane network node, a Mobile services Switching Center (MSC)/Serving General packet radio service Support Node (SGSN) node, a Gateway Mobile Location Center (GMLC) node and a user-plane positioning platform node further comprising a Service Location Protocol (SLP) node.

14. The method of claim 10, wherein said wireless network is a Code Division Multiple Access 2000 (CDMA2000) network and said translation nodes comprise at least one of a user equipment (UE) node, a location services (LCS) client node, a Base Station Subsystem (BSS) network node, a Mobile services Switching Center (MSC) node, a Mobile Positioning Center (MPC) node and a user-plane positioning platform node comprising a Service Location Protocol (SLP) node.

15. The method of claim 10, wherein said translation nodes are simultaneously operational in a plurality of wireless networks and a plurality of radio access technologies.

16. The method of claim 10, wherein each of said translation nodes exchange information describing supported languages associated with each of said translation nodes with at least one other node.

17. The method of claim 16, wherein a configuration change of at least one of said translation nodes initiates said exchange of supported language information from said at least one of said translation nodes.

18. The method of claim 16, wherein said exchange occurs based on a broadcast message received from said wireless network.

19. The method of claim 10, wherein each of said translations nodes exchange information describing a preferred language associated with each of said translation nodes.

20. The method of claim 1, further comprising signaling of said language associated with said information element to said wireless network.

21. The method of claim 1, further comprising signaling of a language translation failure to said wireless network.

22. The method of claim 1, wherein said reply comprises a sequence of said positioning information translated into different languages.

23. The method of claim 22, wherein said different languages in said sequence are prioritized based on a geographical location of a translation node associated with said client.

24. The method of claim 1, wherein said translating further comprises accessing a translation database associated with another node on said wireless network.

25. The method of claim 1, wherein said positioning-related message further comprises a positioning result.

26. The method of claim 1, wherein said destination further comprises another node in said wireless network.

27. The method of claim 1, wherein said destination further comprises user equipment (UE) communicatively connected to said wireless network.

28. The method of claim 1, wherein said client is associated with a Public Safety Answer Point (PSAP).

* * * * *

UNITED STATES PATENT AND TRADEMARK OFFICE
CERTIFICATE OF CORRECTION

PATENT NO. : 8,804,574 B2  
APPLICATION NO. : 13/094172  
DATED : August 12, 2014  
INVENTOR(S) : Siomina et al.

Page 1 of 2

Figure 8:
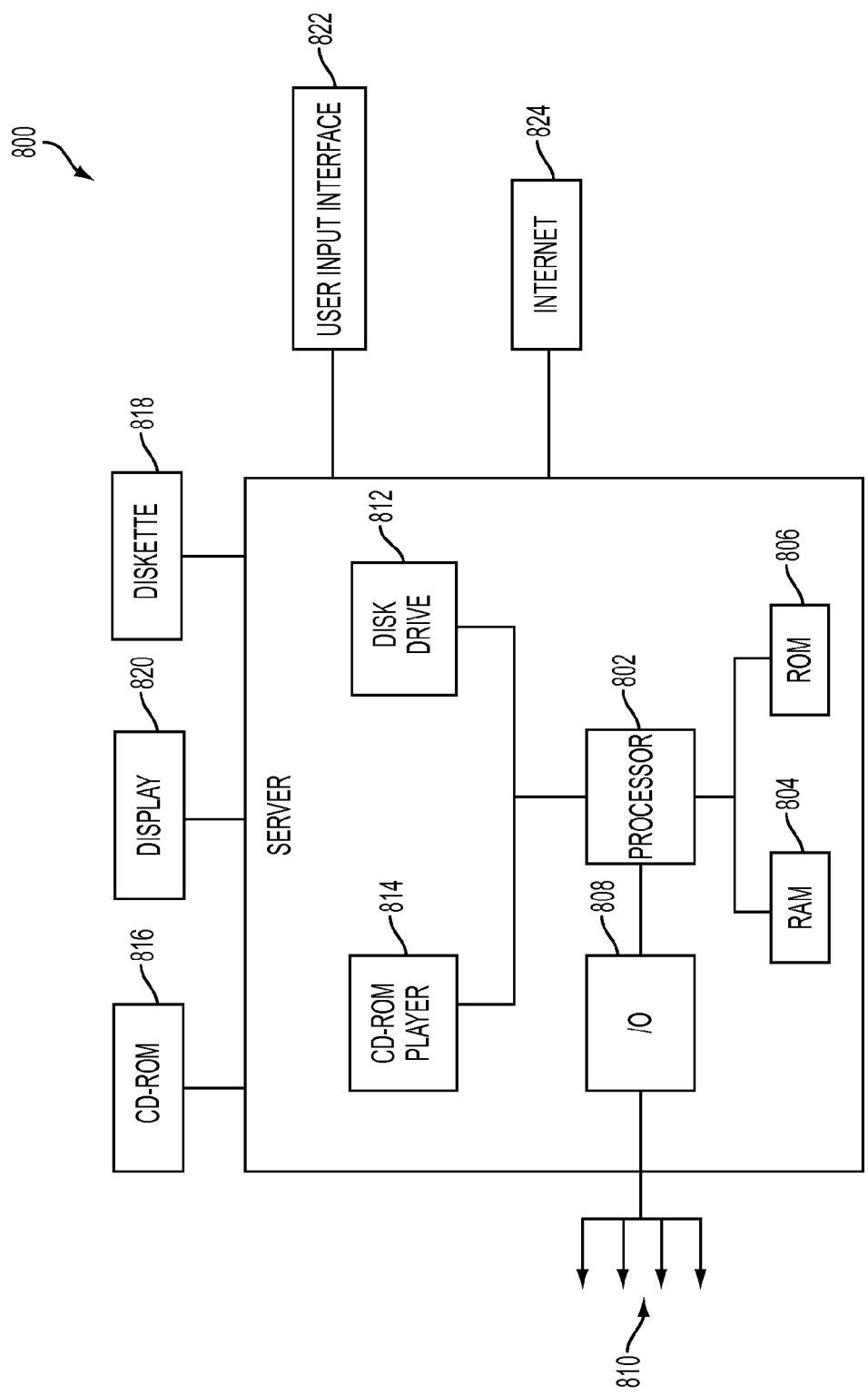
FIG. 8 illustrates an exemplary network node or access point.

It is certified that error appears in the above-identified patent and that said Letters Patent is hereby corrected as shown below:

In the Drawings:

In Fig. 8, Sheet 8 of 11, for Tag "808", in Line 1, delete "/O" and insert -- I/O --, therefor.

In the Specification:

In Column 1, Line 9, delete "HELD" and insert -- FIELD --, therefor.

In Column 1, Line 67, delete "computing," and insert -- computing --, therefor.

In Column 2, Line 31, delete "the as" and insert -- the UE as --, therefor.

In Column 2, Line 35, delete "abuse" and insert -- a base --, therefor.

In Column 2, Line 44, delete "my be" and insert -- may be --, therefor.

In Column 3, Line 40, delete "anode" and insert -- a node --, therefor.

In Column 5, Line 16, delete "MIME" and insert -- MME --, therefor.

In Column 5, Line 32, delete "(provideCapabilities" and insert -- provideCapabilities --, therefor.

In Column 5, Line 36, delete "(provideCapabilities" and insert -- provideCapabilities --, therefor.

In Column 6, Line 13, delete "here" and insert -- where --, therefor.

In Column 6, Line 47, delete "and networks" and insert -- and LTE networks --, therefor.

Signed and Sealed this  
Twenty-fifth Day of August, 2015

Michelle K. Lee  
*Director of the United States Patent and Trademark Office*

CERTIFICATE OF CORRECTION (continued)

In Column 6, Line 48, delete "defined connection" and insert -- defined in connection --, therefor.

In Column 7, Line 10, delete "through the" and insert -- HLR through the --, therefor.

In Column 8, Line 25, delete "emergency" and insert -- (emergency --, therefor.

In Column 8, Line 48, delete "odes" and insert -- nodes --, therefor.

In Column 10, Lines 52-53, delete "mil/or" and insert -- and/or --, therefor.

In Column 10, Line 62, delete "e.g. Table 2" and insert -- e.g. in Table 2 --, therefor.

In Column 11, Line 14, delete "typically" and insert -- typically in --, therefor.

In Column 11, Line 30, delete "shalt" and insert -- shall --, therefor.

In Column 11, Line 47, delete "eNode)," and insert -- eNodeB), --, therefor.

In Column 11, Line 67, delete "SLP)." and insert -- (e.g., SLP). --, therefor.

In Column 12, Line 4, delete "LCS" and insert -- LCS Client, --, therefor.

In Column 12, Line 31, delete "MSC/SCGN," and insert -- MSC/SGSN, --, therefor.

In Column 13, Line 4, delete "IF" and insert -- IE --, therefor.

In Column 13, Line 15, delete "LIE" and insert -- LTE --, therefor.

In Column 13, Line 21, delete "via," and insert -- via --, therefor.

In Column 13, Line 58, delete "LIE." and insert -- UE. --, therefor.

In Column 14, Line 17, delete "LIT" and insert -- LPP --, therefor.

In Column 14, Line 26, delete "LPPA)," and insert -- LPPa), --, therefor.

In Column 14, Line 30, delete "eNode gateway→eNodeB," and insert -- eNodeB gateway→ home eNodeB, --, therefor.

In Column 16, Line 21, delete "process" and insert -- processor --, therefor.

In Column 19, Line 26, delete "cat be" and insert -- can be --, therefor.